(12) United States Patent
McCorkendale et al.

(10) Patent No.: US 7,739,494 B1
(45) Date of Patent: Jun. 15, 2010

(54) SSL VALIDATION AND STRIPPING USING TRUSTWORTHINESS FACTORS

(75) Inventors: Bruce McCorkendale, Manhattan Beach, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 1310 days.

(21) Appl. No.: 11/226,766

(22) Filed: Sep. 13, 2005

Related U.S. Application Data

(63) Continuation-in-part of application No. 10/424,532, filed on Apr. 25, 2003, now Pat. No. 7,366,919, which is a continuation-in-part of application No. 11/020,514, filed on Dec. 21, 2004.

(51) Int. Cl.
*H04L 29/06* (2006.01)
(52) U.S. Cl. .................. 713/156; 713/152; 713/154; 713/194; 726/15; 726/22
(58) Field of Classification Search ......... 713/150–156, 713/158–159, 169–170, 175, 187–188, 193–194; 726/2, 10–13, 15, 22–25
See application file for complete search history.

(56) References Cited

U.S. PATENT DOCUMENTS

| | | | |
|---|---|---|---|
| 5,392,207 A | 2/1995 | Wilson et al. | |
| 5,675,710 A | 10/1997 | Lewis | |
| 5,757,916 A | 5/1998 | MacDoran et al. | |
| 5,778,304 A | 7/1998 | Grube et al. | |
| 5,826,249 A | 10/1998 | Skeirik | |
| 5,887,269 A | 3/1999 | Brunts et al. | |
| 5,930,474 A | 7/1999 | Dunworth et al. | |
| 5,982,897 A | 11/1999 | Clark | |
| 6,023,723 A | 2/2000 | McCormick et al. | |
| 6,052,709 A | 4/2000 | Paul | |
| 6,058,484 A * | 5/2000 | Chapman et al. ............... 726/10 |
| 6,072,942 A | 6/2000 | Stockwell et al. | |
| 6,088,803 A | 7/2000 | Tso et al. | |
| 6,154,172 A | 11/2000 | Piccionelli et al. | |
| 6,161,130 A | 12/2000 | Horvitz et al. | |
| 6,167,434 A | 12/2000 | Pang | |

(Continued)

FOREIGN PATENT DOCUMENTS

WO   WO 01/71499 A1   9/2001

OTHER PUBLICATIONS

Royer, Vincent, "SSLStripper," www.vroyer.com, indexed by www.archive.org Jul. 30, 2004.*

(Continued)

*Primary Examiner*—Kimyen Vu
*Assistant Examiner*—Darren Schwartz
(74) *Attorney, Agent, or Firm*—Fenwick & West LLP

(57) ABSTRACT

Computer-implemented methods, apparati, and computer-readable media for thwarting computer attacks. A method embodiment of the present invention comprises the steps of examining (52) a digital certificate (20) presented by a server computer (2); compiling (53) a set of suspicion indications (31) gleaned from said examining step (52); feeding (54) said suspicion indications (31) to a trustworthiness calculation engine (30); and outputting from said engine (30) a trustworthiness factor (32) that determines whether SSL stripping is to be used (57) on communications with said server computer (2).

20 Claims, 4 Drawing Sheets

U.S. PATENT DOCUMENTS

| | | | |
|---|---|---|---|
| 6,182,223 B1 | 1/2001 | Rawson | |
| 6,202,158 B1 | 3/2001 | Urano et al. | |
| 6,249,807 B1 | 6/2001 | Shaw et al. | |
| 6,253,169 B1 | 6/2001 | Apte et al. | |
| 6,282,565 B1 | 8/2001 | Shaw et al. | |
| 6,282,660 B1 | 8/2001 | Anne et al. | |
| 6,289,416 B1 | 9/2001 | Fukushima et al. | |
| 6,298,351 B1 | 10/2001 | Castelli et al. | |
| 6,314,409 B2 | 11/2001 | Schneck | |
| 6,324,569 B1 | 11/2001 | Ogilvie et al. | |
| 6,347,310 B1 | 2/2002 | Passera | |
| 6,370,526 B1 | 4/2002 | Agrawal et al. | |
| 6,370,629 B1 | 4/2002 | Hastings et al. | |
| 6,397,200 B1 | 5/2002 | Lynch, Jr. et al. | |
| 6,397,215 B1 | 5/2002 | Kreulen et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,453,419 B1 | 9/2002 | Flint et al. | |
| 6,456,991 B1 | 9/2002 | Srinivasa et al. | |
| 6,480,885 B1 | 11/2002 | Olivier | |
| 6,487,586 B2 | 11/2002 | Ogilvie et al. | |
| 6,493,007 B1 | 12/2002 | Pang | |
| 6,493,752 B1 | 12/2002 | Lee et al. | |
| 6,502,082 B1 | 12/2002 | Toyama et al. | |
| 6,505,167 B1 | 1/2003 | Horvitz et al. | |
| 6,546,416 B1 | 4/2003 | Kirsch | |
| 6,640,301 B1 | 10/2003 | Ng | |
| 6,643,685 B1 | 11/2003 | Millard | |
| 6,650,890 B1 | 11/2003 | Irlam et al. | |
| 6,654,787 B1 | 11/2003 | Aronson et al. | |
| 6,658,114 B1 * | 12/2003 | Farn et al. | 380/277 |
| 6,687,740 B1 | 2/2004 | Gough | |
| 6,691,156 B1 | 2/2004 | Drummond et al. | |
| 6,697,942 B1 | 2/2004 | L'Hereux | |
| 6,701,347 B1 | 3/2004 | Ogilvie | |
| 6,711,608 B1 | 3/2004 | Ogilvie | |
| 6,732,157 B1 | 5/2004 | Gordon et al. | |
| 6,757,713 B1 | 6/2004 | Ogilvie et al. | |
| 6,757,830 B1 | 6/2004 | Tarbotton et al. | |
| 6,859,791 B1 | 2/2005 | Spagna et al. | |
| 6,901,346 B2 | 5/2005 | Tracy et al. | |
| 6,928,553 B2 | 8/2005 | Xiong et al. | |
| 7,010,696 B1 | 3/2006 | Cambridge et al. | |
| 7,055,027 B1 * | 5/2006 | Gunter et al. | 713/151 |
| 7,096,368 B2 | 8/2006 | Kouznetsov et al. | |
| 7,155,484 B2 | 12/2006 | Malik | |
| 7,299,351 B2 * | 11/2007 | Huitema et al. | 713/156 |
| 2002/0016831 A1 | 2/2002 | Peled et al. | |
| 2002/0038308 A1 | 3/2002 | Cappi | |
| 2002/0042687 A1 | 4/2002 | Tracy et al. | |
| 2002/0083343 A1 | 6/2002 | Crosbie | |
| 2002/0087641 A1 | 7/2002 | Levosky | |
| 2002/0087649 A1 | 7/2002 | Horvitz | |
| 2002/0087882 A1 | 7/2002 | Schneier et al. | |
| 2002/0120848 A1 * | 8/2002 | Mont et al. | 713/175 |
| 2002/0133523 A1 | 9/2002 | Ambler et al. | |
| 2002/0138525 A1 | 9/2002 | Karadimitriou et al. | |
| 2002/0138581 A1 | 9/2002 | MacIntosh et al. | |
| 2002/0147694 A1 | 10/2002 | Dempsey et al. | |
| 2002/0147782 A1 | 10/2002 | Dimitrova et al. | |
| 2002/0156902 A1 | 10/2002 | Crandall | |
| 2002/0157020 A1 | 10/2002 | Royer | |
| 2002/0165912 A1 | 11/2002 | Wenocur et al. | |
| 2002/0199095 A1 | 12/2002 | Bandini et al. | |
| 2002/0199186 A1 | 12/2002 | Ali et al. | |
| 2002/0199194 A1 | 12/2002 | Ali | |
| 2003/0009699 A1 * | 1/2003 | Gupta et al. | 713/201 |
| 2003/0018891 A1 * | 1/2003 | Hall et al. | 713/160 |
| 2003/0033587 A1 | 2/2003 | Ferguson et al. | |
| 2003/0037251 A1 | 2/2003 | Frieder | |
| 2003/0046128 A1 | 3/2003 | Heinrich | |
| 2003/0051026 A1 | 3/2003 | Carter | |
| 2003/0105864 A1 | 6/2003 | Mulligan et al. | |
| 2003/0149726 A1 | 8/2003 | Spear | |
| 2003/0167311 A1 | 9/2003 | Kirsch | |
| 2003/0191969 A1 | 10/2003 | Katsikas | |
| 2003/0200334 A1 | 10/2003 | Grynberg | |
| 2003/0220978 A1 | 11/2003 | Rhodes | |
| 2003/0229672 A1 | 12/2003 | Kohn | |
| 2003/0229801 A1 | 12/2003 | Kouznetsov et al. | |
| 2003/0233415 A1 | 12/2003 | Beyda | |
| 2004/0003283 A1 | 1/2004 | Goodman et al. | |
| 2004/0015725 A1 * | 1/2004 | Boneh et al. | 713/201 |
| 2004/0024823 A1 | 2/2004 | Del Monte | |
| 2004/0054887 A1 | 3/2004 | Paulsen, Jr. et al. | |
| 2004/0064734 A1 | 4/2004 | Ehrlich | |
| 2004/0068534 A1 | 4/2004 | Angermayr et al. | |
| 2004/0073617 A1 | 4/2004 | Milliken et al. | |
| 2004/0073810 A1 | 4/2004 | Dettinger et al. | |
| 2004/0093383 A1 | 5/2004 | Huang et al. | |
| 2004/0093384 A1 | 5/2004 | Shipp | |
| 2004/0111480 A1 | 6/2004 | Yue | |
| 2004/0148358 A1 | 7/2004 | Singh et al. | |
| 2004/0177271 A1 | 9/2004 | Arnold et al. | |
| 2004/0181665 A1 * | 9/2004 | Houser | 713/158 |
| 2004/0187023 A1 | 9/2004 | Alagna et al. | |
| 2004/0205173 A1 | 10/2004 | Hall | |
| 2005/0015455 A1 | 1/2005 | Liu | |
| 2005/0097179 A1 | 5/2005 | Orme | |
| 2005/0144480 A1 | 6/2005 | Kim et al. | |
| 2006/0005239 A1 * | 1/2006 | Mondri et al. | 726/13 |
| 2006/0075504 A1 | 4/2006 | Liu | |
| 2007/0169190 A1 * | 7/2007 | Kolton et al. | 726/22 |

OTHER PUBLICATIONS

Lee, Sin Yeung; Low, Wai Lup and Wong, Pei Yuen, "Learning Fingerprints for a Database Intrusion Detection System", Computer Security Laboratory, DSO National Labortories, Singapore, ESORICS Nov. 2002, LNCS 2502, pp. 264-279.

Low, Wai Lup, et al., "DIDAFIT: Detecting Intrusions in Databases Through Fingerprinting Transactions," ICEIS 2002, Fourth International Conference on Enterprise Information Systems, vol. 1, Apr. 3-6, 2002, pp. 121-128, Ciudad Real, Spain.

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~rdanyliw/snort/CHANGELOG>, U.S.A.

AirCERT web page, last updated Sep. 18, 2000 [online]. Cert.org [retrieved Apr. 18, 2003]. Retrieved from the Internet: <URL: http://www.cert.org/kb/aircert/>, U.S.A.

Analysis Console for Intrusion Detection (ACID) web page [online]. Andrew.cmu.edu [retrieved Apr. 18, 2003]. Retrieved from the Internet: <URL: http://www.andrew.cmu.edu/~rdanyliw/snort/snortacid.html>, U.S.A.

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>, U.S.A.

Web page, announcing Nov. 11, 2000 release of Dshield [online]. Deja.com [retrieved Apr. 18, 2003]. Retrieved from the Internet: >URL: http://groups.google.com/groups?selm=8vm48v%245pd%241%40nnrp1.deja.com&oe=UTF-8&output=gplain>, U.S.A.

e=Security, Inc., Correlation Technology for Security Event Management, Oct. 7, 2002 [online]. eSecurityins.com [retrieved Apr. 18, 2003]. Retrieved from the Internet: <URL: http://www.esecurityinc.com/downloads/Correlation_WP.pdf>, Vienna, VA.

MyNetWatchman.com web pages indicating Sep. 2000 beta release [online]. MyNetWatchman.com [retrieved Apr. 18, 2003]. Retrieved from the Internet: <URL: http://www.mynetwatchman.com/mynetwatchman/relnotes.htm>, Alpharetta, GA.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>, U.S.A.

Slashdot.org web pages describing Dshield, dated Nov. 27, 2000 [online]. Slashdot.org [retrieved Apr. 18, 2003]. Retrieved from the Internet: <URL: http://slashdot.org/article.pl?sid=00/11/27/1957238&mode=thread>, U.S.A.

Chung, C., Gertz, M., and Levitt, K., "DEMIDS: A Misuse Detection System for Database Systems," Department of Computer Science, University of California at Davis, Oct. 1, 1999, pp. 1-18.

SCIP Product, Microdasys—"*The need to control, inspect and manage encrypted webtraffic*."[online]. Retrieved on Mar. 18, 2005. Retrieved from the Internet: <URL: http://www.microdasys.com/scipproduct+M54a708de802.html>. Author unknown, 2 pages, Czech Republic.

Microdasys, "*S C I P Secured Content Inspection: Protecting the Enterprise from CryptoHacks*," 2003 by Microdasys Inc., 2 pages, Czech Republic.

Marketing, "*Digital Certificates—Best Practices—A Microdasys Whitepaper*," bestpractice.doc, Revision 1.1 (Jul. 31, 2003), 6 pages, Czech Republic.

Network Computing Solutions—"*Microdasys SCIP*" [online]. Retrieved on Mar. 18, 2005. Retrieved from the Internet: <URL: http://www.ncs/cz/index.php?language=en&menuitem-4&subitem=13>, 2 pages, Czech Republic.

Network Computing Solutions—NSC Homepage—*News* [online]. Retrieved on Mar. 18, 2005. Retrieved from the Internet: <URL: http://www.nsc.cz/index.php?language=en&menuitem=0&subitem=4&subitem=13>, 3 pages, Czech Republic.

"*SSL Stripper Installation Guide*," [online]. Retrieved in Mar. 2005 from the Internet: <URL: http://www.sslstripper.com>, 2 pages, U.S.A.

SSL Stripper Home Page, "*Security Solutions: SSL Stripper*," [online]. Retrieved on Mar. 18, 2005. Retrieved from the Internet: <URL: http://www.vroyer.org/sslstripper/index.html>, 2 pages, Oct. 15, 2004, U.S.A.

SSL Stripper Sample Screenshots, "*Security Solutions: Sample Screenshots*," [online]. Retrieved on Mar. 18, 2005. Retrieved from the Internet: <URL: http://www.vroyer.org/sslstripper/screenshots.html>, 3 pages, Oct. 15, 2004, U.S.A.

Webwasher AG/Full feature set, "*Full feature set*," [online]. Retrieved on Mar. 18, 2005. Retrieved from the Internet: <URL: http://www.webwasher.com/enterprise/products/webwasher_products/ssl_scanner/full_feature_set..html?I...>, 2 pages.

Webwasher AG/Webwasher 1000 CSM Appliance, "*Webwasher 1000 CSM Appliance*," [online]. Retrieved on Mar. 18, 2005. Retrieved from the Internet: <URL: http://www.webwasher.com/enterprise/products/webwasher_products/csm_appliance/index...> 2 pages.

Webwasher AG/Webwasher URL Filter, "*Webwasher URL Filter*," [online]. Retrieved on Mar. 18, 2005. Retrieved from the Internet: <URL: http://www.webwasher.com/enterprise/products/webwasher_products/webwasher_url_filter..> 1 page.

Webwasher AG/Webwasher Anti Virus, "*Webwasher Anti Virus*," [online]. Retrieved on Mar. 18, 2005. Retrieved from the Internet: <URL: http://www.webwasher.com/enterprise/products/webwasher_products/anti_virus/index.html...>, 2 pages.

Webwasher AG/VVebwasher Anti Spam, "*Webwasher Anti Spam*,"[online]. Retrieved on Mar. 18, 2005. Retrieved from the Internet: <URL: http://www.webwasher.com/enterprise/products/webwasher_products/anti_spam/index.htm...>, 1 page.

Webwasher AG/Webwasher Content Protection, "*Webwasher Content Protection*," [online]. Retrieved on Mar. 18, 2005. Retrieved from the Internet: <URL: http://www.webwasher.com/enterprise/products/webwasher_products/content_protection/index.html>, 2 pages.

Webwasher AG/Webwasher SSL Scanner, "*Webwasher SSL Scanner*,"[online]. Retrieved on Mar. 18, 2005. Retrieved from the Internet: <URL: http://www.webwasher.com/enterprise/products/webwasher_products/ssl_scanner/index.html>, 2 pages.

CyberGuard Corporation, "*CyberGuard and Webwasher: The Value Proposition*," A CyberGuard Corporation White Paper, May 2004, 6 pages.

Basis Technology's Rosette Language Identifier, 2 pages, downloaded from http://www.basistech.com/language-identification/ on Aug. 25, 2005, U.S.A.

cauce.org web pages [online]. Coalition Against Unsolicited Commercial Email [retrieved Mar. 17, 2003]. Retrieved from the Internet: <URL: http://www.cauce.org/about/problem.shtml>.

Cavnar, William B. et al., "N-Gram Based Text Categorization," Proceedings of the SDAIR-94, $3^{rd}$ Annual Symposium on Document Analysis and Information Retrieval, Las Vegas, NV, USA, Apr. 13, 1994.

Cranor, Faith L., LaMacchia Brian A., "Spam!" Communications of the ACM, vol. 41, No. 8, pp. 74-83, Aug. 1998, U.S.A.

How it Works: Spam Recognition, http://www.death2spam.net/docs/classifier.html, retrieved Aug. 18, 2005, U.S.A.

Karp-Rabin algorithm, 3 pages, downloaded from http://www-igm.univ-mlv.fr/~lecrog/string/node5.html on Sep. 1, 2005, U.S.A.

Kularski, C., "Compound Procedures for Spam Control," Highland School of Technology, Jan. 2004.

NBEC/NWOCA Anti-Spam Tools, [online] [retrieved Jul. 7, 2004] retrieved from http://home.nwoca.org.

"N-Gram Based Text Categorization," 2 pages, downloaded from http://citeseer.ist/psu.edu/68861.htm, Aug. 25, 2005 U.S.A.

Outlook.spambully.com web pages [online] Spam Bully [retrieved Jan. 16, 2003] Copyright 2002, Retrieved from the Internet<URL:http://outlook.spambully.com/about.php>.

The Rabin-Karp algorithm, String searching via Hashing, 5 pages, downloaded from http://www.eecs.harvard.edu/~ellard/Q-07/HTML/root/node43 on Aug. 31, 2005 U.S.A.

Rabin-Karp string search algorithm, 5 pages, downloaded from http://en.wikipedia.org/wiki/Rabin-Karp_string_search_algorithm on Aug. 31, 2005 U.S.A.

Spam Assassin, The Apache SpamAssassin Project, 2 pages, downloaded from http://spamassassin.apache.org on Aug. 25, 2005, U.S.A.

"Technical Responses to Spam," Nov. 2003, Taughannock Networks.

TextCat Language Guesser, 2 pages, downloaded from http://odur.let.rug.nl/~vannord/Textcat/ on Aug. 25, 2005, U.S.A.

Wikipedia.org web pages (online). Wikipedia (retrieved Mar. 17, 2003). Retrieved from the Internet: <URL: http://www.wikipedia.org/w/wiki.phtml?title= Machine learning & printable=yes>.

\* cited by examiner

US 7,739,494 B1

SSL VALIDATION AND STRIPPING USING TRUSTWORTHINESS FACTORS

RELATED APPLICATION

This patent application claims the benefit of and is a continuation-in-part of U.S. patent application Ser. No. 10/424,532 filed on Apr. 25, 2003 now U.S. Pat. No. 7,366,919, entitled "Use of Geo-Location Data for Spam Detection," having the same assignee and the same two inventors as the present patent application. This patent application further claims the benefit of and is a continuation-in-part of U.S. patent application Ser. No. 11/020,514 filed on Dec. 21, 2004, entitled "Presentation of Network Source and Executable Characteristics," having the same assignee and the same two inventors as the present patent application. Said two earlier filed patent applications are hereby incorporated by reference in their entireties into the present patent application.

TECHNICAL FIELD

This invention pertains to the field of preventing malicious attacks to computers when the SSL (Secure Sockets Layer) protocol and related protocols are employed.

BACKGROUND ART

The SSL (Secure Sockets Layer) protocol is a popular Internet protocol for allowing a client computer to engage in secure communications with a server computer. For example, using the SSL protocol, a user may divulge his credit card number to a merchant's Website secure in the knowledge that all communications with the Website are encrypted. However, the SSL protocol provides that encrypted communications must pass straight through the enterprise firewall unexamined. This is because the SSL protocol requires end-to-end encryption (from server to browser). This can be dangerous, as it means that data can be stolen or malicious computer code tunneled through the firewall impervious to examination by security scanning software associated with the firewall.

Enterprises are reluctant to deal with this problem, because there are so many useful Websites that require SSL in order to operate properly, e.g., sites performing credit card transactions. Attempts to provide whitelists of allowable SSL Websites anger internal users and create a high administrative burden for security administrators.

As firewalls are configured to block traffic more strictly on ports known to be used by Remote Access Trojans (RATs) or suspicious traffic in general, attackers are increasingly tunneling return traffic from a compromised computer to the attacker's network using SSL. Tunneling using SSL allows a compromised host computer to communicate through the enterprise firewall, and the strong encryption provided by SSL prevents security software from examining and recognizing the dangerous contents of that traffic.

One solution to this problem is known as "SSL stripping". In this patent application, including claims, "SSL stripping" means that a proxy associated with the firewall is configured to conduct a type of intentional man-in-the-middle attack on SSL traffic. The client computers within the enterprise network are configured to trust an enterprise signing key, and the proxy uses said enterprise signing key to spoof an arbitrary Website outside the confines of the enterprise network, thus enabling the proxy to decrypt and then carefully examine the SSL traffic. SSL stripping is powerful but is not appropriate in all circumstances, because of its increased overhead and for other reasons.

What is needed is a way to determine when SSL stripping is appropriate and when it is not appropriate. The present invention solves this problem.

DISCLOSURE OF INVENTION

Computer-implemented methods, apparati, and computer-readable media for thwarting computer attacks. A method embodiment of the present invention comprises the steps of examining (52) a digital certificate (20) presented by a server computer (2); compiling (53) a set of suspicion indications (31) gleaned from said examining step (52); feeding (54) said suspicion indications (31) to a trustworthiness calculation engine (30); and outputting from said engine (30) a trustworthiness factor (32) that determines whether SSL stripping is to be used (57) on communications with said server computer (2).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

The present invention will be primarily illustrated in conjunction with the SSL (Secure Sockets Layer) protocol, although it has applicability to any other security protocol (such as S/MIME) in which an unencrypted digital certificate is used to proclaim the authenticity of an entity that issued the digital certificate.

Figure 1:
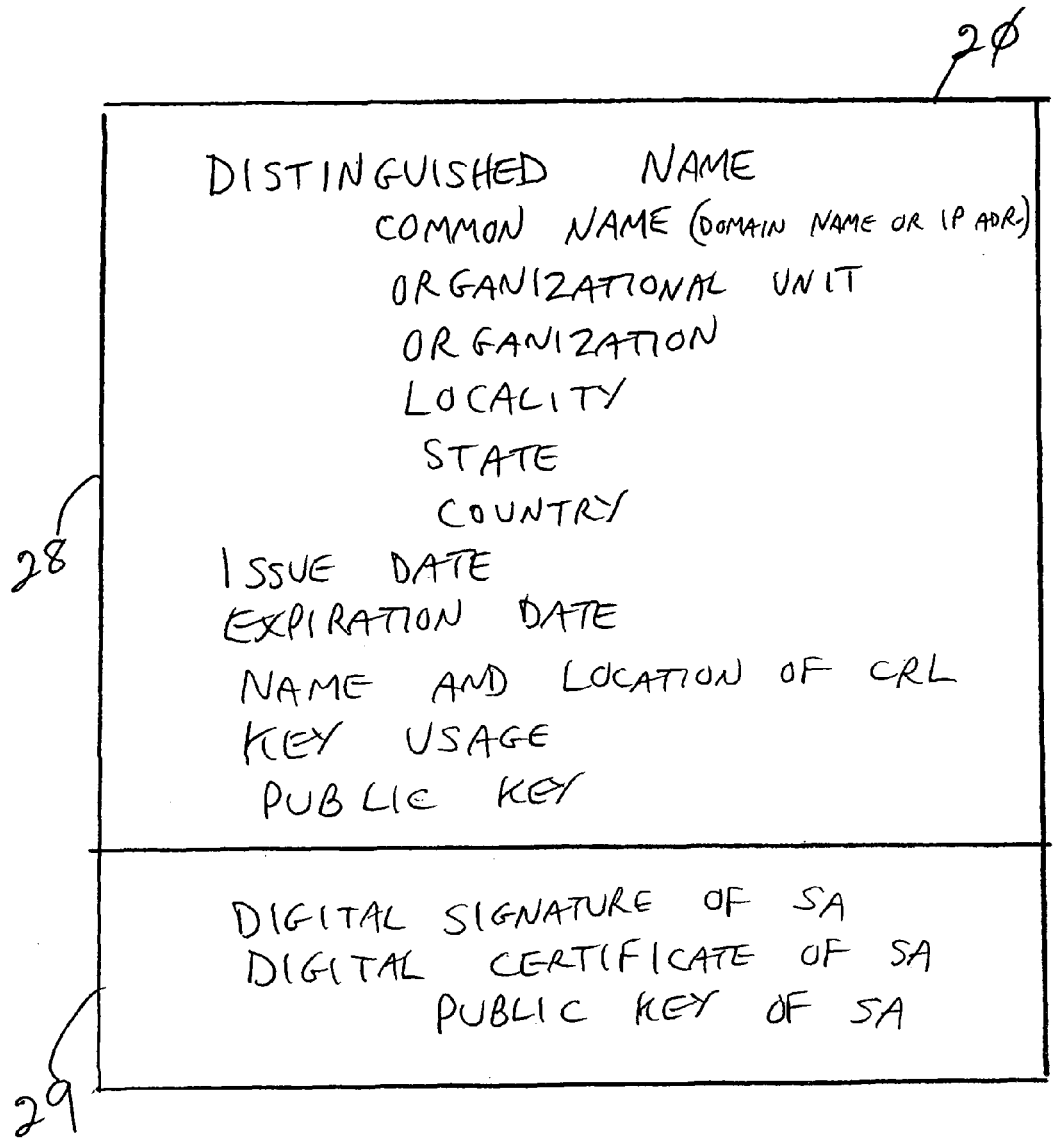
FIG. 1 is an illustration of a typical digital signature 20.

A typical digital certificate 20 is illustrated in FIG. 1. There are a number of protocols and standards, including the X.509 standard and the PKCS 7 standard, that specify mandatory and optional fields that should be used in digital certificates. The digital certificate 20 illustrated in FIG. 1 contains the following fields:

Distinguished Name. The distinguished name is the concatenation of several fields, including Common Name, one or more Organizational Units, Organization, Locality, State, and Country.

Common Name. The Common Name is usually the domain name (e.g., amazon.com) of the computer 2 that presented the certificate 20. However, the Common Name can also be the IP (Internet Protocol) address (e.g., 12.23.45.61) of the computer 2 that presented the certificate 20.

Issue Date. This is the date that the digital certificate 20 was issued by the Signing Authority (SA), the entity that digitally signed the certificate 20.

Expiration Date. This is the date on which the digital certificate 20 will expire. After the expiration date, the digital certificate 20 should not be further used or accepted.

Name and Location of Certificate Revocation List (CRL). This is the name and location associated with a list 24 that publishes IDs of digital certificates 20 that have been revoked.

This field is sometimes referred to as a "CRL distribution point". An example is URL=http://crl.versign.com/RSASecureServer.crl.

Key Usage. These fields indicate certain attributes of the digital certificate 20. One such field indicates whether the certificate 20 can legally be used as a server in the SSL authentication process.

Public Key. This is the public key of the computer 2 that presented the digital certificate 20. The public key is paired with a private key so that techniques of public key cryptography (as that term is normally defined) can be employed.

The fields described above are referred to collectively as the "certificate proper" 28.

Digital Signature of Signing Authority (SA). The signing authority (SA) is the entity that vouchsafes the authenticity of the digital certificate 20. The SA's digital signature is formed by the signing authority using a hash function to create a message digest of the certificate proper 28, then encrypting said message digest using its private key.

Digital Certificate of Signing Authority. This digital certificate is used by third parties to verify the legitimacy of the signing authority, and typically contains the same or similar fields as certificate proper 28, including the public key of the SA. The two fields described immediately above are referred to as the "signing block" 29.

Figure 2:
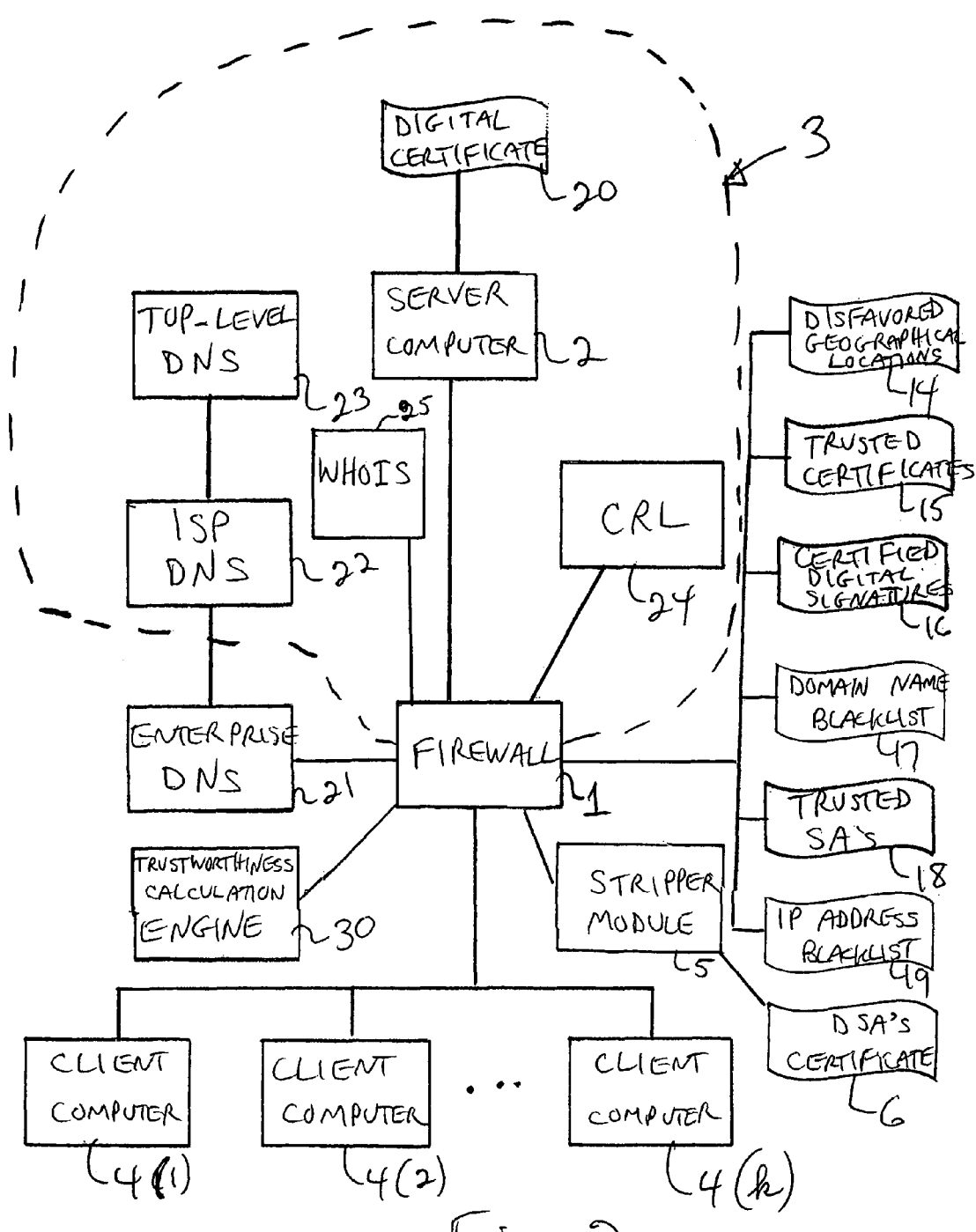
FIG. 2 is a block diagram illustrating apparatus suitable for carrying out the present invention.

FIG. 2 illustrates apparatus suitable for carrying out the present invention. Firewall 1 is situated at the boundary of the overall network 3 (which may be the Internet) and the enterprise network. Computers and/or modules that are part of the enterprise network and are coupled to firewall 1 include: a plurality of client computers 4, an enterprise Domain Name Server (DNS) 21, a trustworthiness calculation engine 30, a blacklist 19 of known troublesome IP addresses, a whitelist 18 of trusted signing authorities, a blacklist 17 of known troublesome domain names, a cache 16 of certified digital signatures, a whitelist 15 of approved (trusted) digital certificates, a blacklist 14 of disfavored geographical locations, a stripper module 5, and the digital certificate of a designated stripping authority (DSA) 6.

Network 3 can be any wired or wireless network, but for purposes of illustration it will often be referred to herein as the Internet.

Within network 3 are a plurality of server computers 2 (for ease of illustration, just one server computer 2 is illustrated in FIG. 2, a computer 2 that presents a digital certificate 20), CRL 24, an ISP (Internet Service Provider) DNS 22 coupled to enterprise DNS 21, top level DNS 23 coupled to ISP DNS 22, and the WHOIS database 25. Top level DNS 23 is the DNS controlled by the custodian of the corresponding top level domain. For example, if the top level domain is .org, the custodian is VeriSign, Inc., of Mountain View, Calif.

Whitelists 15 and 18, cache 16, blacklists 14, 17, and 19, and enterprise DNS 21 are optional, i.e., they are not used in every deployment of the present invention. Whitelists 15 and 18, cache 16, and blacklists 14, 17, and 19 are typically embodied in the form of either disk or memory caches coupled to firewall 1.

Modules 1, 5, 6, 14-19, 21, and 30 can be implemented in any combination of hardware, firmware, and/or software. When implemented in software, these modules can reside on one or more computer-readable media, such as one or more hard disks, floppy disks, CDs, DVDs, etc.

Figures 3, 4:
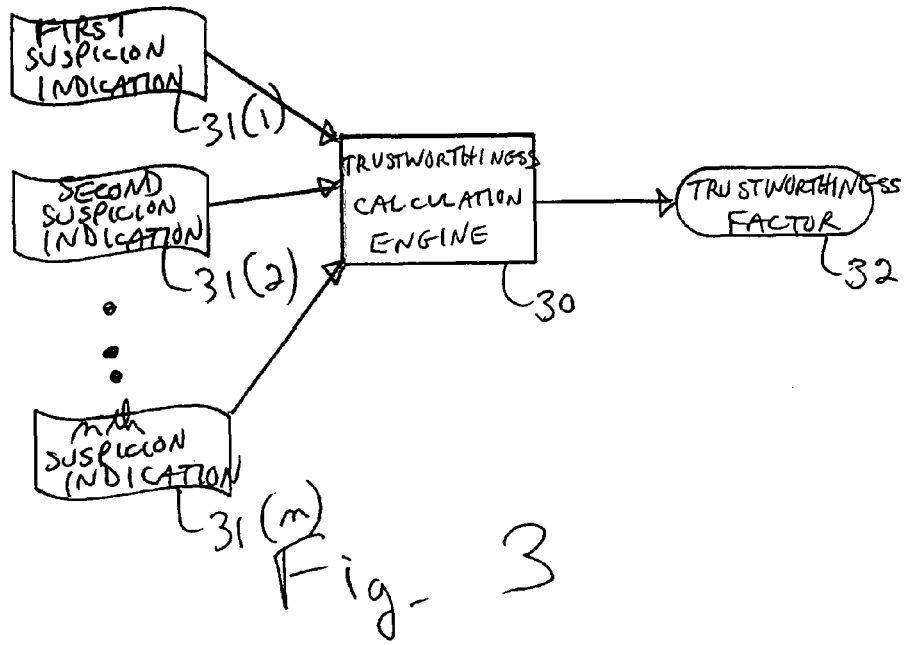
FIG. 3 is a block diagram illustrating trustworthiness calculation engine 30 of the present invention.
FIG. 4 is an illustration of a domain name server 40.

FIG. 3 illustrates that trustworthiness calculation engine 30 can be a state machine or any other type of calculation module having a plurality of inputs corresponding to suspicion indications 31 and an output corresponding to trustworthiness factor 32. Suspicion indications 31 are generated by firewall 1 upon investigation of certain events and items, many of which are obtained by examining the digital certificate 20 presented by server computer 2. There are many factors 31 that could possibly give rise to a suspicion that digital certificate 20 is part of a computer attack. Said suspicion indications 31 include, but are not limited to, the following:

A self-signed digital certificate 20. A self-signed digital certificate 20 gives rise to suspicion of nefarious intent, because very few attackers are willing to incur the accountability that follows from applying for a digital certificate 20 from a legitimate signing authority (such as VeriSign). Attackers who use Trojan horses tend to use self-signed digital certificates 20. A self-signed digital certificate 20 can be detected by comparing the public key as given in the certificate proper 28 with the public key of the signing authority as given in the signature block 29.

A digital certificate 20 that was not issued by a trusted signing authority. Firewall 1 can test the trustworthiness of the signing authority by examining the digital certificate of the signing authority as given in the signature block 29, using conventional techniques of public key cryptography. This may entail going up a chain of digital certificates until a root certificate is encountered. A root certificate is a digital certificate that is self-signed by a signing authority that firewall 1 trusts. The process of verifying trustworthiness can be facilitated by firewall 1 consulting whitelist 15 of trusted certificates and/or whitelist 18 of trusted signing authorities.

A digital certificate 20 that has been revoked. Revocation of the digital certificate 20 can be checked by firewall 1 examining the certificate revocation list 24 that is referred to in the certificate proper 28.

A digital certificate 20 that has expired. The expiration of the digital certificate 20 can be checked by firewall 1 examining the expiration date field within the certificate proper 28, and comparing this date with the date produced by firewall 1's internal clock.

A digital certificate 20 having a common name comprising an IP address. This condition can be determined by firewall 1 checking the common name field of the certificate proper 28. Most legitimate organizations utilize a URL (containing a domain name) for their common name, rather than an IP address. Therefore, an IP address as the common name is inherently suspicious.

A digital certificate 20 that has been tampered with. This tampering can be detected by firewall 1 using techniques of public key cryptography. Specifically, in order to validate that digital certificate 20 has not been tampered with, firewall 1 decrypts the digital signature of the signing authority using the public key of the signing authority, to get a first message digest. Then firewall 1 compares the first message digest with a second message digest that it calculates by applying to the certificate proper 28 the same hash function that the signing authority used to calculate its version of the message digest. For the SSL protocol, the hash function is usually MD-5. If the first and second message digests are the same, firewall 1 concludes that digital certificate 20 has not been tampered with. In order to speed this verification process, a cache 16 of previously verified digital signatures can be maintained. Firewall 1 first checks cache 16. If the digital signature appears in cache 16, firewall 16 does not have to perform the entire verification process.

A digital certificate 20 having a common name comprising a domain name that does not match an IP address of the server computer 2 that presented the digital certificate 20. This condition can be checked by means of firewall 1 performing a reverse DNS lookup on said IP address. The layout of a typical Domain Name Server (DNS) 21-23 is shown in FIG.

4. DNS 21-23 is indexed by domain name. For each domain name that is fed to DNS 21-23 as an input, DNS 21-23 produces a corresponding IP address. Reverse DNS lookup means that firewall 1 feeds an IP address as the input to DNS 21-23. The DNS database then produces a corresponding domain name. In this case, firewall 1 feeds DNS 21-23 with the IP address of the server computer 2 that presented the digital certificate 20. The result of the reverse DNS lookup is a domain name. That domain name is compared with the domain name within the common name field of the certificate proper 28. If the two domain names are not identical, firewall 1 has reason to suspect nefarious intent.

To perform the reverse DNS lookup, firewall 1 first consults enterprise DNS 21 contained in a storage means coupled to firewall 1. If the given IP address is not located within enterprise DNS 21, firewall 1 next consults the next higher level DNS, which is the DNS 22 of the Internet Service Provider (ISP). If the IP address is not in ISP DNS 22, firewall 1 checks top level DNS 23.

Domain name appears on blacklist 17. Firewall 1 obtains the domain name from the common name field in the digital certificate 20 or else by doing a reverse DNS lookup based upon the IP address in the common name field, as described above. Blacklist 17 is supplied by the customer's system administrator or by the software publisher. Presence of the domain name on blacklist 17 gives rise to a suspicion indication 31, i.e., a decrease in the value of trustworthiness factor 32. Alternatively, firewall 1 could look for the domain name in a pre-established whitelist, and the presence in said whitelist would result in an increase in the value of trustworthiness factor 32.

IP address appears on blacklist 19. Firewall 1 obtains the IP address from the common name field of the digital certificate 20, or else by performing a lookup in DNSs 21-23 using as an index the domain name from the common name field. Blacklist 19 is supplied by the customer's system administrator or by the software publisher. Presence of the IP address in blacklist 19 constitutes a suspicion indication 31, and results in a decrease in the value of trustworthiness factor 32. Alternatively, firewall 1 could look for the IP address in a pre-established whitelist. The presence of the IP address in said whitelist would result in an increase in the value of trustworthiness factor 32.

The geographical location of server 2 is disfavored. The geographical location of the server 2 is obtained by firewall 1 from the IP address contained in the common name field of digital certificate 20, by doing a DNS lookup, or by any of the other techniques discussed in the above-cited priority U.S. patent application Ser. No. 10/424,532 filed Apr. 25, 2003. Firewall 1 can compare this information against a blacklist 14 of disfavored geographical locations, or otherwise come to a conclusion that the geographical location of server 2 is disfavored by using one of the techniques described in the above-cited priority U.S. patent application Ser. No. 10/424,532 filed Apr. 25, 2003.

A server 2 that is hosted by a dialup connection, cable modem, or DSL. A server 2 that is hosted by a dialup connection, cable modem, or DSL is inherently suspicious, because a well-established entity would normally use a more expensive network connection such as a T-1 line. Real Time Black Hole Lists (RBL's), other public databases, and any other available information that indicates ranges of addresses that are used by Internet Service Providers for dialup, cable modem, or DSL addresses can be used to determine a type of suspicious network connection from the IP address of server 2.

Server 2 has a new domain name. The creation date of the domain name can be determined by firewall 1 consulting the WHOIS database 25. "New" is predefined and fed as a parameter to trustworthiness calculation engine 30.

One of the first N times that the client 4 went to this server 2. N is a pre-selected integer and is fed as a parameter to trustworthiness calculation engine 30. Communications between client 4 and server 2 that are relatively scarce are inherently more suspicious than communications between client 4 and server 2 that are relatively frequent.

Relatively low rate of communications between any client 4 and server 2. Generally speaking, the more times that clients 4 communicate with server 2, the safer. Google API's can be used to consult even broader statistics than are locally available.

Previous history of SSL stripping 57; negative results of the stripping 57. This is a recursive factor. The fact that a server 2 was previously subjected to SSL stripping 57 is in itself inherently suspicious. It is even more suspicious if the result of the previous SSL stripping 57 was a decision to block communications with that server 2. A time decay factor can be placed on this recursive factor, so that it does not forever taint the server 2.

Spot check. This is a purely random criterion. It is based on the concept that apart from the above factors, all of which are based on known suspicious events, it might well be useful to simply subject certain randomly selected communications to SSL stripping 57.

The various suspicion indications 31 are given corresponding pre-selected weights by trustworthiness calculation engine 30, which uses a pre-selected algorithm (such as the sum of the individual weighted factors 31) to output trustworthiness factor 32. The algorithm allows the indications 31 to be combined in any arbitrary pre-selected fashion. Some characteristics 31 will increase the value of trustworthiness factor 32, while others will decrease it. The weights and the algorithm itself can be changed over time, by changing settings within engine 30. Furthermore, the weights and the algorithm can vary from application to application; and from customer to customer.

Figure 5:
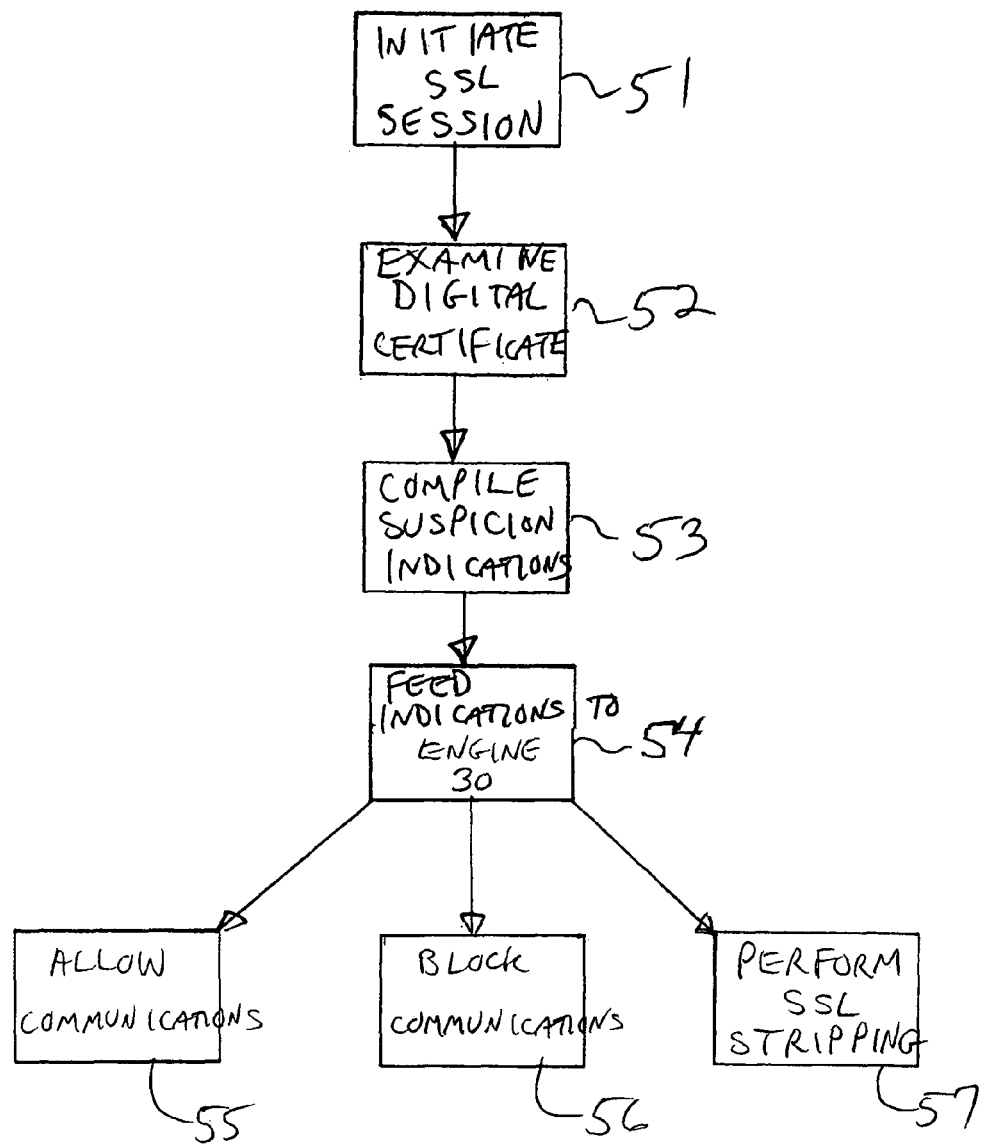
FIG. 5 is a flow diagram illustrating a method embodiment of the present invention.

A method embodiment of the present invention is illustrated in FIG. 5. At step 51, the SSL session (or other session employing digital certificates 20) is initiated. In the case of SSL, this is done by client computer 4 requesting that a SSL session be opened.

At step 52, firewall 1 examines the digital certificate 20 presented by the server computer 2.

At step 53, firewall 1 compiles the set of suspicion indications 31, as described above.

At step 54, firewall 1 feeds the suspicion indications 31 as inputs to trustworthiness calculation engine 30, which outputs trustworthiness factor 32.

Based upon the value of trustworthiness factor 32, firewall 1 (or a module associated with firewall 1, such as module 5) executes one of steps 55, 56, or 57. The decision as to which of steps 55-57 to execute is based upon a pre-selected pair of thresholds are associated with trustworthiness factor 32. The lower threshold governs whether communications with server 2 are completely blocked at step 56 or stripping module 5 is invoked at step 57; and the higher threshold governs whether stripping module 5 is invoked at step 57 or communications with server 2 are allowed at step 55. A value of trustworthiness factor 32 that is below the lower threshold will thus result in a blocking 56 of communications with server 2. A value of trustworthiness factor 32 that falls between the lower threshold and the higher threshold will result in stripping module 5 performing SSL stripping 57 to further investigate communications with server 2. A value of trustworthiness factor 32 that is higher than the higher threshold will result in communications with server 2 being allowed 55.

The thresholds can be different from application to application, and thus tailored to the needs of the individual customers. Similarly, the thresholds can be changed over time within an application. The two thresholds can be set to be equal, which allows a system administrator who is unwilling to assume the cost and overhead of SSL stripping 57 to fall back to an SSL validation-only technique, i.e., communications will either be allowed 55 or blocked 56. However, for those customers willing to incur the cost of employing SSL stripping 57 in some cases in order to allow legitimate interface with sites 2 that may be overzealously blocked by an SSL validation-only scheme, the SSL stripping 57 allows application of finer-grained application-layer examination-based policies implemented by HTTP proxies 5 such as those present in software products manufactured by Symantec Corporation of Cupertino, Calif.

In addition to its use described above, trustworthiness factor 32 can be made available to other modules associated with the enterprise network as a property of the connection/session. This trustworthiness factor 32 property can then be used by any proxy or rule examining the connection, and factor 32 can be logged for use in incident management correlation scenarios. Intrusion-prevention engines that are capable of "exploit detection" and blocking allow use of such property-sharing techniques for enhanced rules.

The SSL stripping performed at step 57 generally works on the basis of stripper module 5 generating a spoofed digital certificate 20 that is trusted by client 4. In one embodiment, stripper module 5 looks up the server computer 2's digital certificate path up to a digital certificate 20 that is trusted by module 5. If the digital certificate 20 of the original server 2 is trusted by module 5, the spoofed certificate 20 generated by module 5 is signed using a digital certificate 6 that has been generated by the DSA (designated stripping authority) and is trusted by all clients 4. If, on the other hand, the digital certificate 20 of server 2 is not trusted by module 5, module 5 still creates a spoofed certificate 20, but this spoofed certificate 20 is signed by a random signing authority that is not trusted by client 4.

The spoofed certificate 20 keeps the same properties as the original certificate 20 (e.g., same validity dates and same X509 extensions), except that the public key of server 2, the issuer name of the SA, and the digital signature of the SA are replaced. The validity dates and the X509 extensions are still verified by client 4.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention. For example, any suspicion indication that is mentioned in either of the two above-cited U.S. patent applications (U.S. patent application Ser. No. 10/424,532 filed Apr. 25, 2003 and U.S. patent application Ser. No. 11/020,514 filed Dec. 21, 2004) can serve as a suspicion indication for purposes of the present invention.

What is claimed is:

1. A computer-implemented method for thwarting computer attacks, said method comprising the steps of:

examining a digital certificate presented by a server computer in response to a secure sockets layer (SSL) session initiated by a client computer;

compiling a set of suspicion indications gleaned from said examining step;

feeding said suspicion indications to a trustworthiness calculation engine;

outputting from said engine a trustworthiness factor that indicates a suspicion that the digital certificate is part of a computer attack;

determining whether to use SSL stripping on communications with said server computer responsive to an evaluation of said trustworthiness factor; and responsive to a positive determination to use SSL stripping, performing SSL stripping on communications between said client computer and said server computer.

2. The method of claim 1 wherein at least one suspicion indication is an indication from the group of indications consisting of:

a self-signed digital certificate;

a digital certificate that was not issued by a trusted signing authority;

a digital certificate having a common name comprising an Internet Protocol (IP) address;

a digital certificate having a common name comprising a domain name that does not match an IP address of the server computer that presented the digital certificate;

the server computer having a disfavored geographical location; and the server computer being hosted by a dialup connection, cable modem, or digital subscriber line (DSL).

3. The method of claim 1 wherein at least one suspicion indication is the digital certificate having a common name comprising a domain name that does not match an IP address of the server computer that presented the digital certificate and wherein a reverse domain name system (DNS) lookup is used to determine whether a common name comprising a domain name in the digital certificate matches an IP address of the server computer that presented the digital certificate.

4. The method of claim 1 wherein determining whether to use SSL stripping comprises:

comparing the trustworthiness factor to a threshold; and determining whether to use SSL stripping responsive to the comparison with the threshold.

5. The method of claim 4 wherein comparing the trustworthiness factor to a threshold comprises:

evaluating the trustworthiness factor against first and second thresholds, wherein the evaluation against the first threshold indicates whether to block communications between said client computer and said server computer and wherein the evaluation against the second threshold indicates whether to allow communications between said client computer and said server computer without using SSL stripping.

6. At least one non-transitory computer-readable storage medium containing executable computer program instructions for thwarting computer attacks, said computer program instructions performing the steps of:

examining a digital certificate presented by a server computer in response to a secure sockets layer (SSL) session initiated by a client computer;

compiling a set of suspicion indications gleaned from said examining step;

feeding said suspicion indications to a trustworthiness calculation engine;

outputting from said engine a trustworthiness factor that indicates a suspicion that the digital certificate is part of a computer attack;

determining whether to use SSL stripping on communications with said server computer responsive to an evaluation of said trustworthiness factor; and responsive to a positive determination to use SSL stripping, performing SSL stripping on communications between said client computer and said server computer.

7. The at least one non-transitory computer-readable medium of claim 6 wherein at least one suspicion indication is an indication from the group of indications consisting of:

a self-signed digital certificate;

a digital certificate that was not issued by a trusted signing authority;

a digital certificate having a common name comprising an Internet Protocol (IP) address;

a digital certificate having a common name comprising a domain name that does not match an IP address of the server computer that presented the digital certificate;

the server computer having a disfavored geographical location; and the server computer being hosted by a dialup connection, cable modem, or digital subscriber line (DSL).

8. The at least one non-transitory computer-readable medium of claim 6 wherein at least one suspicion indication is the digital certificate having a common name comprising a domain name that does not match an IP address of the server computer that presented the digital certificate and wherein a reverse domain name system (DNS) lookup is used to determine whether a common name comprising a domain name in the digital certificate matches an IP address of the server computer that presented the digital certificate.

9. The at least one non-transitory computer-readable medium of claim 6 wherein determining whether to use SSL stripping comprises:

comparing the trustworthiness factor to a threshold; and determining whether to use SSL stripping responsive to the comparison with the threshold.

10. The at least one non-transitory computer-readable medium of claim 9 wherein comparing the trustworthiness factor to a threshold comprises:

evaluating the trustworthiness factor against first and second thresholds, wherein the evaluation against the first threshold indicates whether to block communications between said client computer and said server computer and wherein the evaluation against the second threshold indicates whether to allow communications between said client computer and said server computer without using SSL stripping.

11. An apparatus for thwarting computer attacks, said apparatus comprising:

at least one non-transitory computer-readable storage medium containing executable computer program instructions, said computer program instructions performing the steps of:

examining a digital certificate presented by a server computer in response to a secure sockets layer (SSL) session initiated by a client computer;

compiling a set of suspicion indications gleaned from said examining step;

feeding said suspicion indications to a trustworthiness calculation engine;

outputting from said engine a trustworthiness factor that indicates a suspicion that the digital certificate is part of a computer attack;

determining whether to use SSL stripping on communications with said server computer responsive to an evaluation of said trustworthiness factor; and responsive to a positive determination to use SSL stripping, performing SSL stripping on communications between said client computer and said server computer.

12. The apparatus of claim 11, wherein at least one suspicion indication is the digital certificate being self-signed.

13. The apparatus of claim 11, wherein at least one suspicion indication is the digital certificate not being issued by a trusted signing authority.

14. The apparatus of claim 11, wherein at least one suspicion indication is the digital certificate having a common name comprising an Internet Protocol (IP) address.

15. The apparatus of claim 11, wherein at least one suspicion indication is the digital certificate having a common name comprising a domain name that does not match an IP address of the server computer that presented the digital certificate.

16. The apparatus of claim 15, wherein a reverse domain name system (DNS) lookup is used to determine whether a common name comprising a domain name in the digital certificate matches an IP address of the server computer that presented the digital certificate.

17. The apparatus of claim 11, wherein at least one suspicion indication is the digital certificate having a disfavored geographical location.

18. The apparatus of claim 11, wherein at least one suspicion indication is the digital certificate being hosted by a dialup connection, cable modem, or digital subscriber line (DSL).

19. The apparatus of claim 11, wherein determining whether to use SSL stripping comprises:

comparing the trustworthiness factor to a threshold; and determining whether to use SSL stripping responsive to the comparison with the threshold.

20. The apparatus of claim 11, wherein comparing the trustworthiness factor to a threshold comprises:

evaluating the trustworthiness factor against first and second thresholds, wherein the evaluation against the first threshold indicates whether to block communications between said client computer and said server computer and wherein the evaluation against the second threshold indicates whether to allow communications between said client computer and said server computer without using SSL stripping.

\* \* \* \* \*